(12) United States Patent
Cardon et al.

(10) Patent No.: US 7,723,892 B2
(45) Date of Patent: May 25, 2010

(54) SYNCHRONOUS MOTOR HAVING MULTIPLE COIL SEGMENTS

(75) Inventors: Vincent Cardon, Arcenant (FR); Jean-Pierre Morel, Les Fourgs (FR)

(73) Assignee: Etel S.A., Motiers (CH)

( * ) Notice: Subject to any disclaimer, the term of this patent is extended or adjusted under 35 U.S.C. 154(b) by 207 days.

(21) Appl. No.: 12/171,907

(22) Filed: Jul. 11, 2008

(65) Prior Publication Data
US 2009/0015095 A1  Jan. 15, 2009

(30) Foreign Application Priority Data
Jul. 13, 2007  (DE) .................... 10 2007 032 680

(51) Int. Cl.
  *H02K 1/00* (2006.01)
  *H02K 41/00* (2006.01)
(52) U.S. Cl. ................. 310/216.079; 310/12.24; 310/216.057; 310/216.058; 310/216.083; 310/216.113
(58) Field of Classification Search ... 310/12.24–12.27, 310/162, 164, 194, 216.004, 216.057–216.058, 310/216.079, 216.081, 216.083, 216.085, 310/216.113, 216.127
See application file for complete search history.

(56) References Cited
U.S. PATENT DOCUMENTS

| | | | |
|---|---|---|---|
| 4,633,108 A * | 12/1986 | von der Heide | 310/12.22 |
| 5,642,013 A | 6/1997 | Wavre | |
| 6,407,471 B1 * | 6/2002 | Miyamoto et al. | 310/12.06 |
| 6,747,376 B2 | 6/2004 | Hashimoto et al. | |
| 6,753,633 B1 * | 6/2004 | Eberle | 310/216.008 |
| 6,762,525 B1 * | 7/2004 | Maslov et al. | 310/112 |
| 6,879,066 B2 | 4/2005 | Hashimoto et al. | |
| 7,095,485 B2 | 8/2006 | Hol et al. | |
| 7,199,492 B2 * | 4/2007 | Hashimoto et al. | 310/12.25 |
| 7,592,720 B2 * | 9/2009 | Busch | 310/12.24 |
| 2003/0111914 A1 | 6/2003 | Miyagawa et al. | |
| 2008/0185932 A1 | 8/2008 | Jajtic et al. | |

FOREIGN PATENT DOCUMENTS

| | | |
|---|---|---|
| DE | 103 18 411 | 11/2003 |
| EP | 1 457 826 | 9/2004 |

OTHER PUBLICATIONS

International Search Report, PCT International Application No. PCT/EP2008/004750, dated Jan. 5, 2009.

* cited by examiner

*Primary Examiner*—Tran N Nguyen
(74) *Attorney, Agent, or Firm*—Kenyon & Kenyon LLP

(57) ABSTRACT

A synchronous motor includes multiple coil segments, each of which has an iron core in the form of a core stack that is wound with a coil. The coil segments are characterized in that the coils press fastening elements having at least two legs against two opposite surfaces of the substantially right parallelepiped iron core. In each case, at least one leg of the fastening element abutting against the iron core is pressed against the iron core, and at least one free leg of the fastening element projects away from the iron core. The free legs are fastened to connecting elements that connect multiple coil segments to one another.

20 Claims, 6 Drawing Sheets

SYNCHRONOUS MOTOR HAVING MULTIPLE COIL SEGMENTS

CROSS-REFERENCE TO RELATED APPLICATIONS

The present application claims priority to Application No. 10 2007 032 680.9, filed in the Federal Republic of Germany on Jul. 13, 2007, which is expressly incorporated herein in its entirety by reference thereto.

FIELD OF THE INVENTION

The present invention relates to a synchronous motor having multiple coil segments.

BACKGROUND INFORMATION

Synchronous motors having a primary part having individually wound coils and a secondary part having permanent magnets are described, for example, in U.S. Pat. No. 5,642,013. The primary part has an iron core made of a laminated core stack having multiple teeth of rectangular cross-section. Coils are wound individually around these teeth such that each coil is wound around precisely one tooth.

German Published Patent Application No. 103 18 411 describes a similar linear motor, the primary part of which has multiple coil segments, which are made up of substantially right parallelepiped core stacks, each of which is wound with a coil. These coil segments are connected to one another mechanically and in a magnetically conductive manner on the side facing away from the secondary part so as to produce a primary part similar to the synchronous motor described in U.S. Pat. No. 5,642,013.

Depending on the application, it may be disadvantageous that between the magnets of the secondary part and the core stack of the primary part of such linear motors there are considerable magnetic forces of attraction that must be absorbed by a bearing.

In certain linear motors, these attractive forces are compensated for. European Published Patent Application No. 1 457 826, for example, describes a linear motor having two secondary parts arranged such that the attractive forces of the two magnetic tracks acting on the coil segments cancel each other out. How the individual coil segments may be connected to one another is not described in further detail. The connection of the individual coil segments is problematic especially if a particularly high efficiency factor of the motor is desired, since every screw or every bolt in the core stack deteriorates the efficiency factor or increases the eddy current losses of the motor.

SUMMARY

Example embodiments of the present invention provide a synchronous motor, the coil segments of which are connected to one another such that a particularly high efficiency factor is achieved. For this purpose, the type of connection is also to allow for a compensation of the attractive forces in the event that this is required for the respective application.

According to example embodiments of the present invention, a synchronous motor includes multiple coil segments, each of which has an iron core in the form of a core stack that is wound with a coil. These coil segments are characterized in that the coils press fastening elements having at least two legs against two opposite surfaces of the substantially right parallelepiped iron core, in each case at least one leg of the fastening element abutting against the iron core being pressed against the iron core, and at least one free leg of the fastening element projecting away from the iron core. The free legs are fastened to connecting elements that connect multiple coil segments to one another.

In particular, after encapsulating a primary part constructed in such a manner from multiple coil segments with a synthetic resin, a very sturdy structure is obtained, which is optimized with respect to its power loss and which may be used in a synchronous motor having compensated magnetic forces.

According to example embodiments of the present invention, a synchronous motor includes: a plurality of coil segments, each coil segment including: a substantially right parallelepiped iron core arranged as a core stack; a wound coil provided about the iron core; and fastening devices pressed by the coil against two opposite surfaces of the iron core, each fastening device including at least two legs, at least one leg of each fastening device abutting against the iron core and pressed against the iron core by the coil, at least one free leg of each fastening device projecting away from the iron core. The synchronous motor includes at least one connection device connecting multiple coil segments to one another, and the free legs of the fastening device fastened to the connection device.

Each fastening device may include an abutting leg and a free leg arranged approximately at a right angle.

The fastening devices may be (a) T-shaped, (b) L-shaped, and/or (c) U-shaped.

The fastening devices may be formed of (a) an electrically non-conductive material, (b) a plastic, and/or (c) a ceramic.

The connecting devices may include extruded aluminum profiles.

The fastening devices may be connected to the connection device by screws.

The fastening devices may be connected to the connection device by a form-locking connection.

The connection device may include cooling channels configured to dissipate heat from the coil segments.

The synchronous motor may include magnets arranged on two sides of the iron cores across from each other in an axial direction of the coils, and the magnets may be arranged at a distance such that attractive forces of the magnets acting on the iron cores cancel each other out.

The synchronous motor may be arranged as a linear motor or as a rotary motor.

The coil may include a first coil half and a second coil half arranged on opposite sides of the coil segment separated by a central interruption, and the first coil half and the second coil half may be electrically connected.

The coil segments may be encapsulated in a synthetic resin.

The at least one connection device may include two connection devices arranged on opposite sides of the iron core and fastened to the free legs of respective fastening devices.

The coil may be wound directly on the iron core, or the coil may be a prefabricated coil.

The fastening devices may be bonded to the iron core.

The fastening devices may be injection-molded.

The synchronous motor may include an insulation device, e.g., a non-conductive film, arranged between the coil and the iron core, and the insulation device may prevent direct contact between the coil and the iron core.

Further features and aspects of example embodiments of the present invention are described in more detail below with reference to the appended Figures.

DETAILED DESCRIPTION

Figure 1:
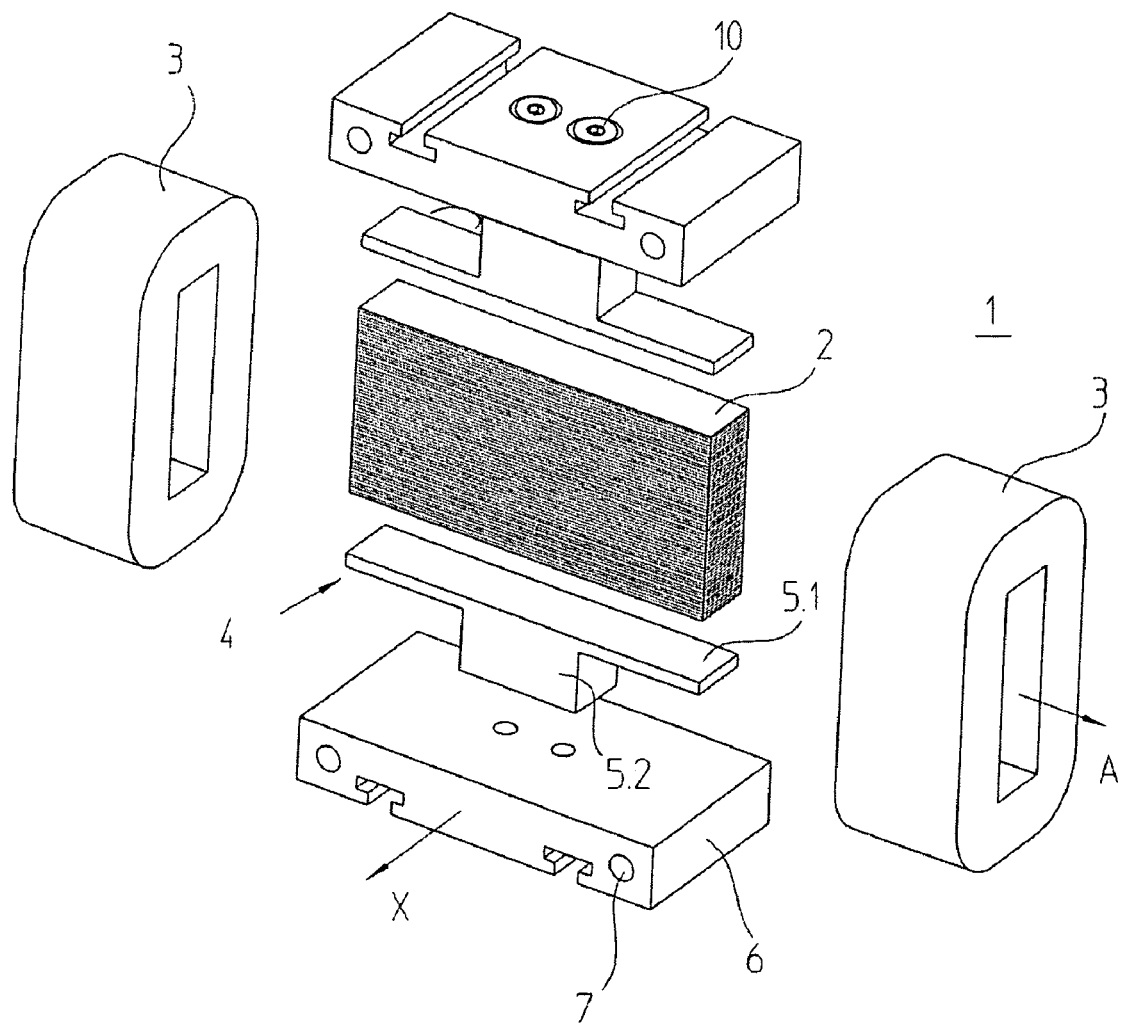
FIG. 1 is an exploded view of a coil segment.
Figure 2:
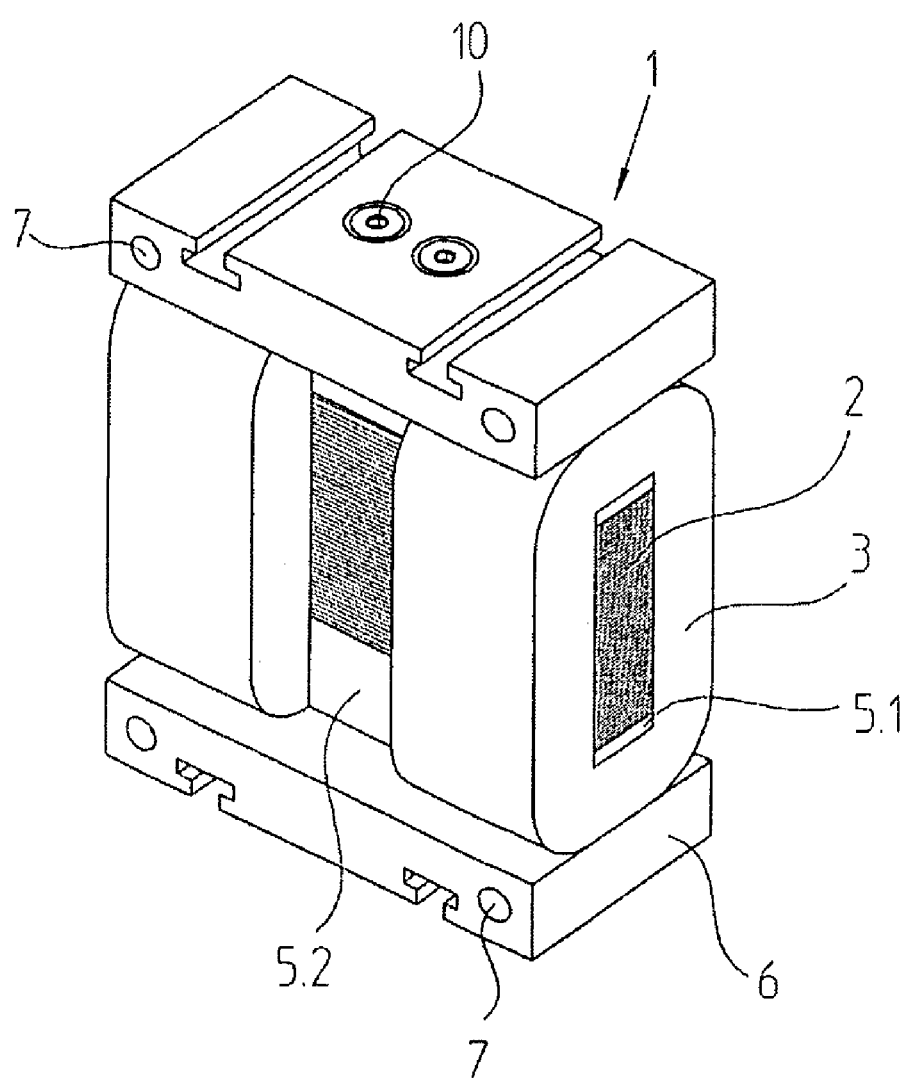
FIG. 2 is a perspective view of the coil segment illustrated in FIG. 1.

FIG. 1 is an exploded view of a coil segment 1, and FIG. 2 shows the coil segment 1 in a fully assembled state. The coil segment includes an iron core 2, which is wound with a coil 3. Iron core 2 may take the form of a laminated core stack. In this instance, the individual rectangular plates are arranged in a plane corresponding to the axial direction A of coils 3 and the direction of motion X of the synchronous motor in order to prevent as much as possible the formation of eddy currents in iron core 2.

Iron core 2 substantially takes the form of a right parallelepiped. Iron core 2 has six planar surfaces that are parallel and congruent in pairs, of which two opposite surfaces are used for fastening. Since, as mentioned above, screws, etc., in iron core 2 result in increased losses, such fastening devices are omitted. Rather, two T-shaped fastening elements 4 are used, each of which has one leg 5.1 abutting against iron core 2 and one leg 5.2 projecting away from iron core 2. The abutting legs 5.1 are pressed against iron core 2 by coil 3. For this purpose, coil 3 may be prefabricated and slipped onto iron core 2 or may be wound directly on iron core 2. The latter approach avoids excessively narrow tolerances for the components used. When slipping on prefabricated coils 3, it is advisable to bond fastening elements 4 to iron core 2. However, coils 3 may be wound directly onto iron core 2 and fastening elements 4 such that bonding is not necessary.

Because of centrally projecting free leg 5.2, no windings of coil 3 may be applied in a central region of coil segment 1, and coil 3 is interrupted in this region. The two halves of the coil, however, are electrically connected to form a single coil 3.

Fastening elements 4 are formed of an electrically non-conductive material such as, for example, a plastic, a ceramic, etc. Via free leg 5.2, they are connected to a connecting element 6 by screws 10 (or by a form-locking connection, such as described below). This connecting element 6 connects multiple coil segments 1 to one another. Connecting element 6 may include an extruded aluminum profile. This profile is cut either to the length of the entire primary part (that is, the length of all coil segments 1 in the direction of motion X) or to the length of one coil segment 1. The individual connecting elements are connected to one another or to the respective application via suitable fastening devices. FIG. 1 shows T-shaped recesses that serve these purposes.

Connecting elements 6 have cooling channels 7 that are used for dissipating heat from coil segments 1. This is a particularly effective measure if fastening elements 4 have good thermal conductivity. A well-suited material for these fastening elements 4 is therefore, for example, the polyphenyl sulfide-based plastic available under the CoolPoly trade name, which is suited for the injection molding process. The ceramics aluminum nitride or $Al_2O_3$, however, are also suitable materials for manufacturing fastening elements 4. Due to the high thermal conductivity of these materials, the heat produced in coil 3 or by eddy currents in iron core 2 may be removed.

The primary part with its multiple coil segments 1 is encapsulated with a synthetic resin in order to give the primary part an approximately right parallelepiped shape, to improve its stability, to improve the thermal conduction to the cooling channels, to protect the coils from external influences and damage, etc.

Figure 3:
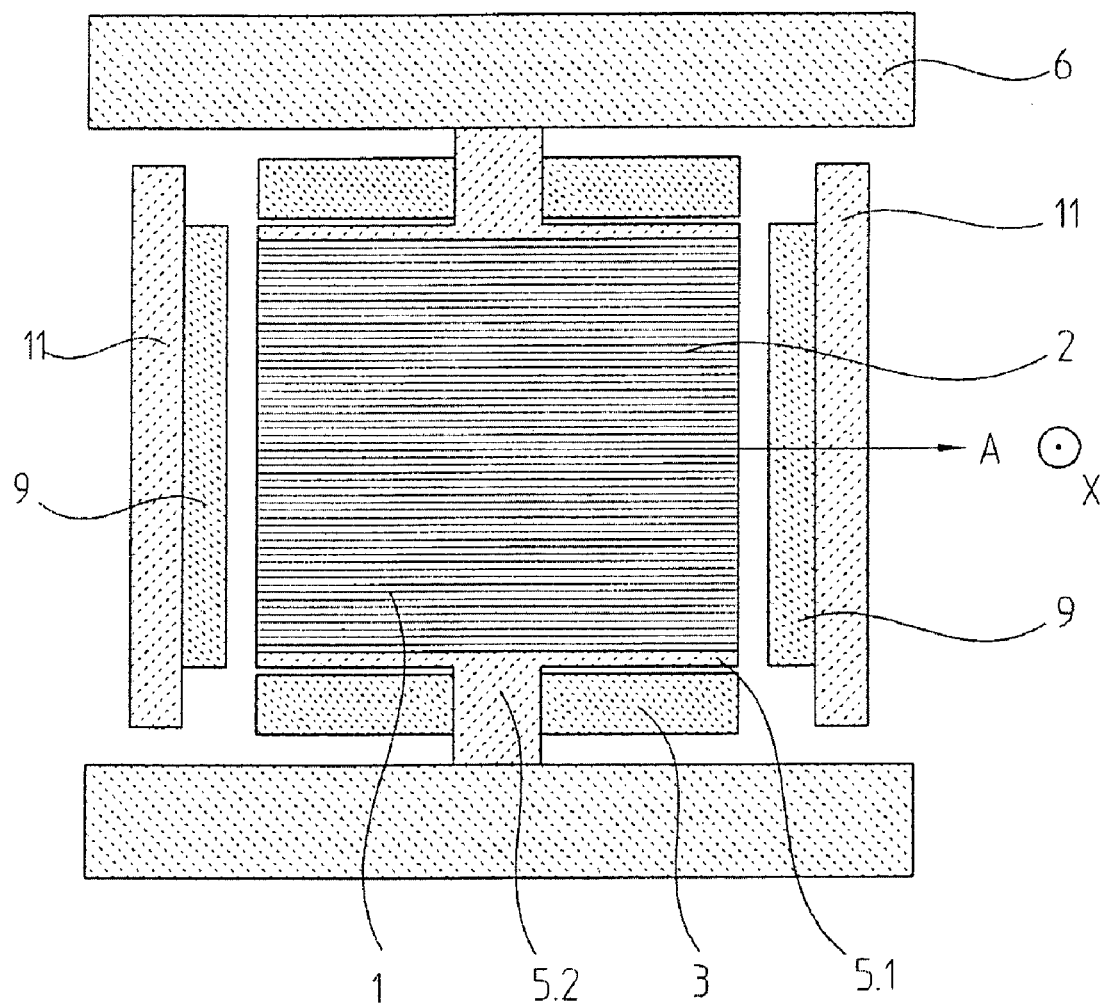
FIG. 3 is a cross-sectional view through a synchronous motor.

FIG. 3 is a cross-sectional view through a complete synchronous motor. The components of the coil segment 1 are identified as indicated above. The axial direction A of coils 3 represented in a sectional view is illustrated, and the direction of motion X of coil segments 1 or of the primary part is perpendicular to the view of FIG. 3. At a distance from the two faces of iron core 2 that are perpendicular to axial direction A of coils 3, magnets 9 are disposed respectively on a yoke 11, e.g., at alternating polarity along the entire length of the linear motor in the direction of motion X. Two magnets 9, which are located across from the faces of a particular coil segment 1, have the same magnetic orientation such that one of the faces is located across from a north pole, while the other face is located across from a south pole. The attractive forces of magnets 9 acting on iron core 2 largely cancel each other out such that a guide for the primary part does not have to absorb great lateral forces.

Figure 4:
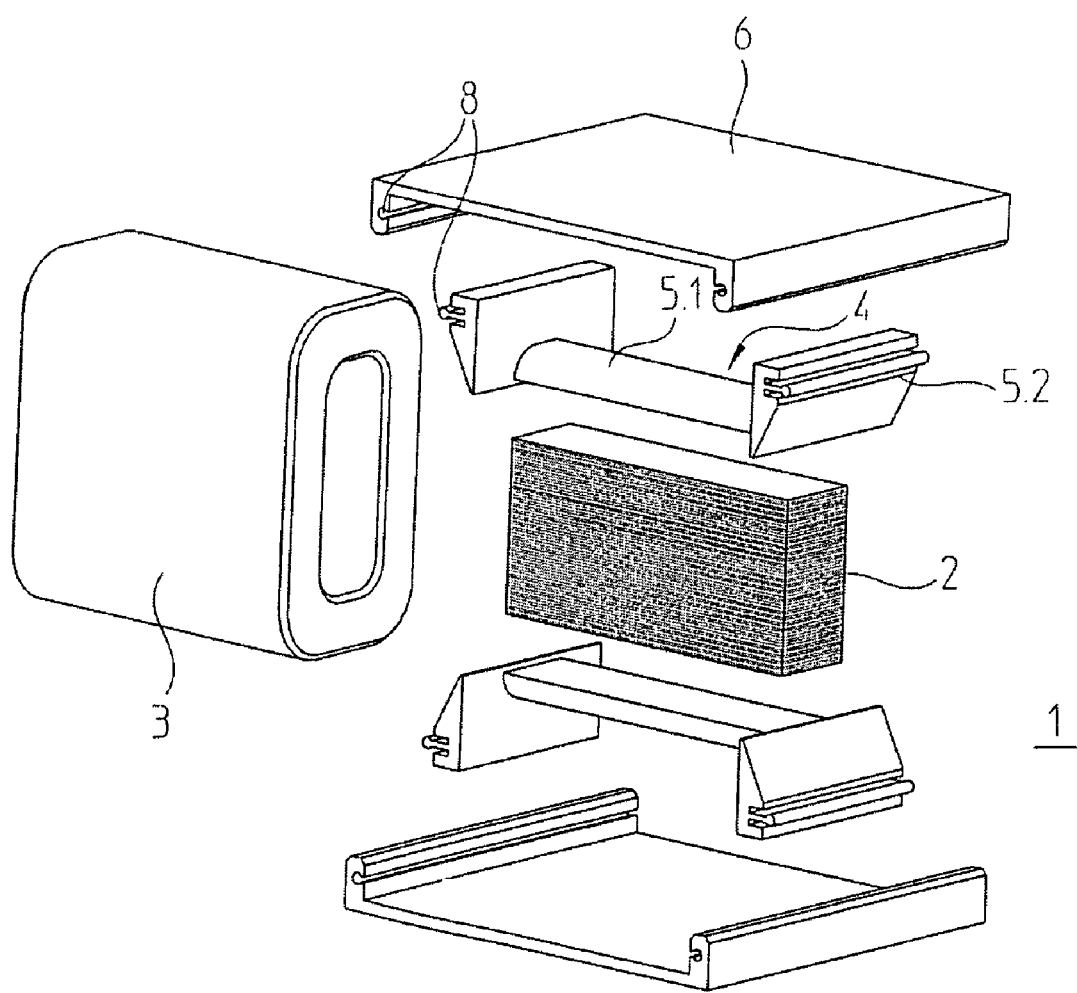
FIG. 4 is an exploded view of a coil segment.
Figure 5:
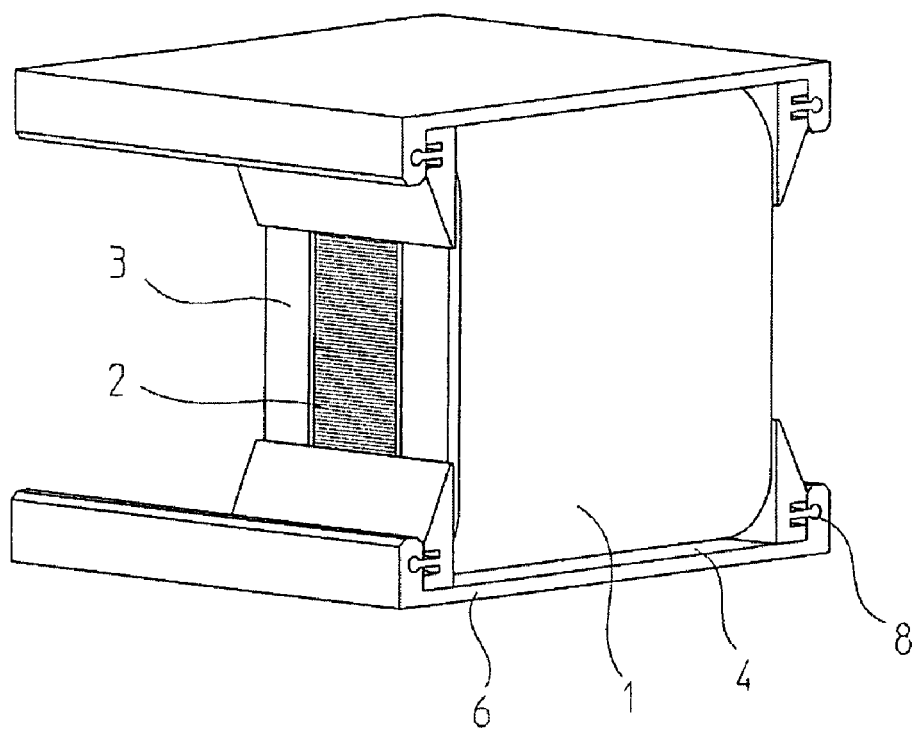
FIG. 5 is a perspective view of the coil segment illustrated in FIG. 4.

FIGS. 4 and 5 illustrate a coil segment 1 according to an example embodiment of the present invention. The main differences with respect to the above-described exemplary embodiment are explained below.

Connecting elements 4 are U-shaped, free legs 5.2 projecting away from the ends of iron core 2. This configuration allows for iron core 2 to be wound completely, which allows for a somewhat higher motor output than in the above-described exemplary embodiment. Connecting element 6 is connected to the free legs 5.2 of the fastening elements via form-locking connections 8.

Mounting prefabricated coils 3 using U-shaped fastening elements 4 is not possible since coils 3 are prevented from slipping onto iron core 2. If two L-shaped connecting elements 4 are combined to form one U-shaped one, however, then the use of prefabricated coils is possible.

In both exemplary embodiments, the regions of iron core 2 wound with coil 3, which are not protected by a fastening element 4, must be provided with insulation in order to prevent direct contact between coil 3 and iron core 2. For this purpose, a thin, non-conductive film made of polyethylene terephthalate and/or polyamide, for example, may be used, which is disposed between iron core 2 and coil 3. Another option for insulating iron core 2 is an apron integrally formed on fastening element 4, which may be slipped onto iron core 2 and which covers at least all regions of iron core 2 that could come into contact with coil 3. Since fastening elements 4 may be manufactured as injection-molded parts, an additional function as insulator may thus be implemented in a cost-effective manner.

Figure 6:
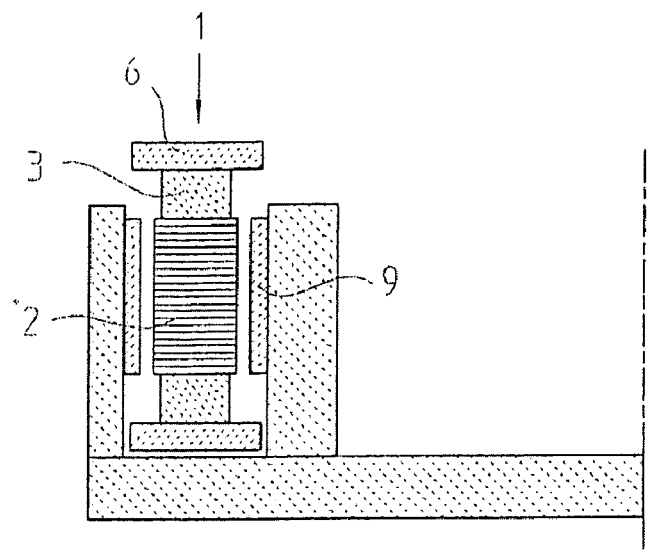
FIG. 6 includes two cross-sectional views of a rotary synchronous motor.
Figure 6:
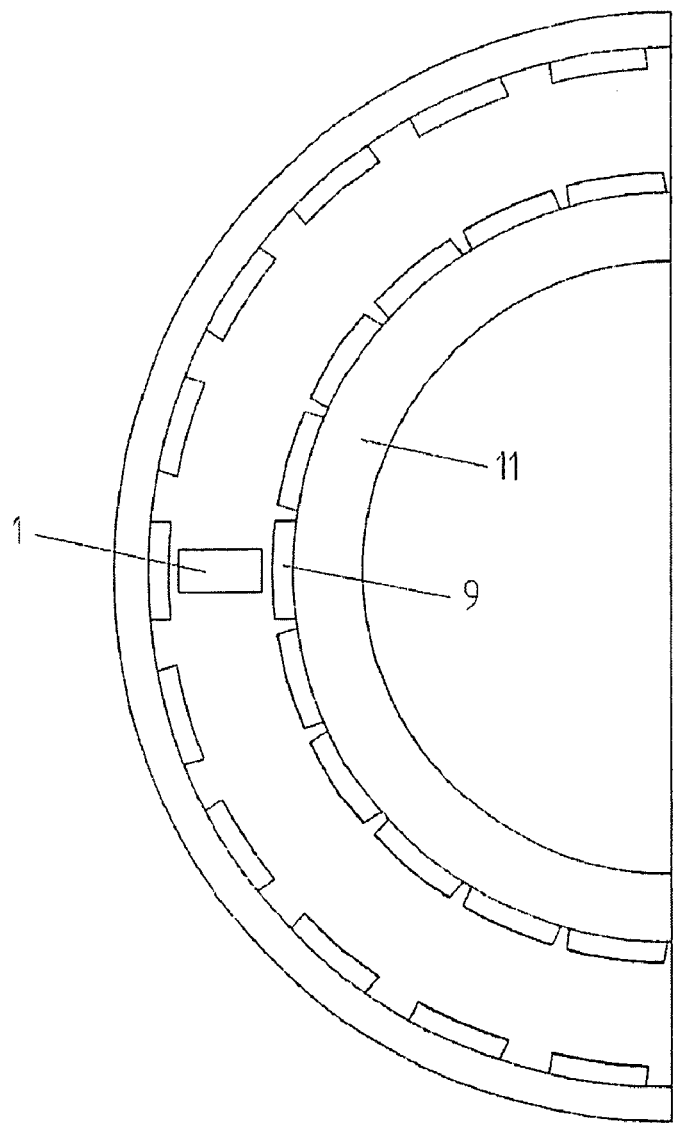

FIG. 6 illustrates that the foregoing may be used not only for linear motors, but that rotary motors (torque motors) are possible as well. Ultimately, such a motor is a linear motor that is curved and closed in a full circle.

What is claimed is:

1. A synchronous motor, comprising:
   a plurality of coil segments, each coil segment including:
   a substantially right parallelepiped iron core arranged as a core stack;
   a wound coil provided about the right parallelepiped iron core; and fastening devices pressed by the coil against two opposite surfaces of the right parallelepiped iron core, each fastening device including at least two legs, at least one leg of each fastening device abutting against the right parallelepiped iron core and pressed against the right parallelepiped iron core by the coil, at least one free leg of each fastening device projecting away from the right parallelepiped iron core; and at least one connection device connecting multiple coil segments to one another, the free legs of the fastening device fastened to the at least one connection device.

2. The synchronous motor according to claim 1, wherein each fastening device includes an abutting leg and a free leg arranged approximately at a right angle.

3. The synchronous motor according to claim 1, wherein the fastening devices are one of (a) T-shaped, (b) L-shaped, and (c) U-shaped.

4. The synchronous motor according to claim 1, wherein the fastening devices are formed of at least one of (a) an electrically non-conductive material, (b) a plastic, and (c) a ceramic.

5. The synchronous motor according to claim 1, wherein the at least one connection device include extruded aluminum profiles.

6. The synchronous motor according to claim 1, wherein the fastening devices are connected to the at least one connection device by screws.

7. The synchronous motor according to claim 1, wherein the fastening devices are connected to the at least one connection device by a form-locking connection.

8. The synchronous motor according to claim 1, wherein the at least one connection device includes cooling channels configured to dissipate heat from the coil segments.

9. The synchronous motor according to claim 1, further comprising magnets arranged on two sides of the right parallelepiped iron core across from each other in an axial direction of the coils, the magnets arranged at a distance such that attractive forces of the magnets acting on the right parallelepiped iron core cancel each other out.

10. The synchronous motor according to claim 1, wherein the synchronous motor is arranged as a linear motor.

11. The synchronous motor according to claim 1, wherein the synchronous motor is arranged as a rotary motor.

12. The synchronous motor according to claim 1, wherein the coil includes a first coil half and a second coil half arranged on opposite sides of the coil segment separated by a central interruption, the first coil half and the second coil half electrically connected.

13. The synchronous motor according to claim 1, wherein the coil segments are encapsulated in a synthetic resin.

14. The synchronous motor according to claim 1, wherein the at least one connection device includes two connection devices arranged on opposite sides of the right parallelepiped iron core and fastened to the free legs of respective fastening devices.

15. The synchronous motor according to claim 1, wherein the coil is wound directly on the right parallelepiped iron core.

16. The synchronous motor according to claim 1, wherein the coil is a prefabricated coil.

17. The synchronous motor according to claim 1, wherein the fastening devices are bonded to the right parallelepiped iron core.

18. The synchronous motor according to claim 1, wherein the fastening devices are injection-molded.

19. The synchronous motor according to claim 1, further comprising an insulation device arranged between the coil and the right parallelepiped iron core, the insulation device arranged to prevent direct contact between the coil and the right parallelepiped iron core.

20. The synchronous motor according to claim 1, wherein the insulation device includes a non-conductive film.

* * * * *